(12) United States Patent
Alderding et al.

(10) Patent No.: US 9,440,707 B2
(45) Date of Patent: Sep. 13, 2016

(54) BULKHEAD SEAL

(75) Inventors: Stefan Alderding, Amsterdam (NL);
Dominicus Franciscus Michael Tack,
Pijnacker (NL)

(73) Assignee: SPLIETHOFF'S BEVRACHTINGSKANTOOR B.V.,
Amsterdam (NL)

(*) Notice: Subject to any disclaimer, the term of this patent is extended or adjusted under 35 U.S.C. 154(b) by 901 days.

(21) Appl. No.: 13/058,599

(22) PCT Filed: Aug. 13, 2009

(86) PCT No.: PCT/EP2009/060517
§ 371 (c)(1),
(2), (4) Date: Apr. 26, 2011

(87) PCT Pub. No.: WO2010/018215
PCT Pub. Date: Feb. 18, 2010

(65) Prior Publication Data
US 2011/0193297 A1 Aug. 11, 2011

(30) Foreign Application Priority Data
Aug. 14, 2008 (EP) .................................. 08162375

(51) Int. Cl.
*B63B 43/04* (2006.01)
*B63B 3/56* (2006.01)
*F16J 15/02* (2006.01)

(52) U.S. Cl.
CPC ............... *B63B 3/56* (2013.01); *F16J 15/025* (2013.01)

(58) Field of Classification Search
CPC ...... F16J 15/025; F16J 15/061; F16J 15/062; F16J 15/104; F16J 15/064
USPC ........ 277/628, 637, 640, 641, 642, 650, 651
See application file for complete search history.

(56) References Cited

U.S. PATENT DOCUMENTS 6,624,252 B2 * 9/2003 Yabe et al. .................... 525/199
2003/0173748 A1 * 9/2003 Bormann et al. ............. 277/628

FOREIGN PATENT DOCUMENTS

| EP | 1101694 | | 5/2001 |
|---|---|---|---|
| EP | 1375766 | | 1/2004 |
| JP | 2003138070 A | * | 5/2003 |
| NL | 1007718 | | 12/1997 |
| WO | WO 98/51562 | | 11/1998 |

OTHER PUBLICATIONS

Search Report of the European Patent Office in counterpart foreign application No. PCT/NL2008/050822 filed Dec. 19, 2008.
Written Opinion of the European Patent Office in counterpart foreign application No. PCT/NL2008/050822 filed Dec. 19, 2008.
European Communication pursuant to Article 94 (3) EPC in corresponding foreign application 09781821.5-1754 dated Apr. 10, 2014.

* cited by examiner

*Primary Examiner* — Gilbert Lee
(74) *Attorney, Agent, or Firm* — Steven M. Koehler; Westman, Champlin & Koehler, P.A.

(57) ABSTRACT

Seal for sealing a gap between a bulkhead and a wall of a cargo hold, wherein the seal comprises a spine with two lateral webs. The webs can for example be tarps comprising magnetic parts. The spine can for example be an angled profile having to legs under right angles provided with slits along their longitudinal top edges for clamping a longitudinal edge of a lateral web. In a specific embodiment a chord can be embedded, e.g., stitched, along the longitudinal edge of the tarp, while the edge with the chord is hold in the slit in the longitudinal top edge of the legs of the spine.

17 Claims, 7 Drawing Sheets

BULKHEAD SEAL

CROSS-REFERENCE TO RELATED APPLICATION

This application is a Section 371 National Stage Application of International Application PCT/EP2009/060517 filed Aug. 13, 2009 and published as WO/2010/018215 in English.

BACKGROUND

The discussion below is merely provided for general background information and is not intended to be used as an aid in determining the scope of the claimed subject matter.

An aspect of the present invention relates to a bulkhead seal for sealing the gap between a bulkhead and the inner wall of a cargo hold, e.g., of a ship.

Many cargo ships for transporting bulk cargo have a single loading area which can be divided into different sections by removable partition walls, generally referred to as bulkheads. An example of such a removable bulkhead system is disclosed in WO 98/51562. The removable bulkheads can for example be provided with recesses or channels in their side ends which are slid over support structures, or pontoon supports, on the wall of the cargo hold. This way, the cargo hold can be compartmented and be used for different types of bulk load or a combination of bulk cargo and other types of cargo.

In order to prevent leakage and/or cross contamination of bulk load at either side of a bulkhead, any gap between the bulkheads and the adjacent ship walls must be sealed. Hitherto, this is tried to be done by filling the gaps, e.g., with a rubber and by using self adhesive tapes, which is elaborate and often not effective.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the invention provides an effective sealing system for bulkheads which can be easily applied and removed.

This aspect is achieved with a seal for sealing a gap between a bulkhead and a wall of a cargo hold, wherein the seal comprises a spine with two lateral webs. This way, the seal can be positioned with the spine in the corner of the cargo hold, while the lateral webs are pressed against the bulkhead and the cargo hold wall respectively, thus sealing off any gap.

The webs and/or the spine can comprise magnetic parts. This way, the seal can adhere to ship's wall and to the bulkhead to seal off the gaps.

The spine can be a rigid spine, while the lateral webs are flexible, e.g., made of a foil, such as a tarp. The spine can for example be an angled profile having two legs under right angles. The profile can for example be of steel or an extruded plastic material, or any other suitable material. Such a profile can for instance be provided with slits in the top end of the longitudinal edges of the profile legs, extending over the full length of the profile. The slits can be dimensioned in such a way that the slits can hold the webs in a clamping manner. The webs can for instance be pulled through the slits.

To this end, the webs can for example be provided with one or more slings for pulling the web. The webs can be provided with one or more chords embedded, e.g., stitched along the edges of the webs. The side edge of the web with the embedded chord can be hold, e.g., pinched, within the slit in the top end of the longitudinal edge of the profile leg.

The lateral webs can for example be of a tarpaulin material. A tarpaulin or tarp is a large sheet of strong, flexible, water resistant or waterproof material, such as a cloth, canvas or woven polyethylene and/or polyester, optionally coated with plastics such as latex or PVC. Other foil type materials can also be used if so desired.

The seal can for instance be put in place by placing the lower end of the seal in the lower corner at the lower end of the gap between the wall of the cargo hold and the bulkhead. The webs with the magnets can be held together by way of the magnets held by the webs. This prevents that the webs already stick to the cargo hold wall or the bulkhead before the seal is positioned in the right place. Then the seal can be erected in the upright position and the webs can be folded out and be magnetically adhered to the wall and the bulkhead respectively.

If the gap is longer than the seal, two or more seals may need to be applied in line above one another. This may for instance be the case if the bulkhead is formed by two or more bulkhead pontoons above one another. To prevent gaps between the abutting ends of these seals, an intersection piece can be used, made of a flexible material, such as a tarp, having a row of magnets at both sides and a pocket with an open end at its upper or lower side. The upper end of the lower seal can be put in the pocket. The lower end of the upper seal can then be applied over the intersection piece. This way, no gap is formed between the lower end of the upper seal and the upper end of the lower seal.

The spine of the seal can be provided with an opening near one or both of its outer ends for passage of fastening means. For bulkheads having a side channel to be slid over support brackets or pontoon supports, the fastening means can for example comprise an F-bar comprising a bar having a fixed clamp head at its outer end, and a removable clamp head slideable over the bar, wherein the fixed clamp head is provided with a magnet facing the removable clamp head. This way, the F-bar without the removable clamp head can be hooked with the magnetic clamp head in the side channel of the bulkhead. The magnet will hold the F-bar in its position, preventing it from falling down. Then the bar of the F-bar can be passed through an opening in the angle profiled spine of the seal. Subsequently, the removable clamp head can be slid over the bar and be screwed on to clamp the seal onto the bulkhead.

Optionally, the spine can be provided with magnets. For instance, the spine can be an angled profile with two perpendicular legs of a plastic material, both legs embedding magnets. With such a spine, the use of clamping means is not needed.

Typically, removable bulkheads are built of pontoons provided with recesses or channels in their side ends which are slid over support structures, or pontoon supports, on the wall of the cargo hold. The walls and/or the pontoons may be provided with support structures and openings, e.g., for mounting a tweendeck or similar provisions. Openings near the gap to be sealed can be closed by a plug, e.g., a plug of plywood, or plastic or the like, before a seal is applied.

For sealing uneven sections, such as sections where support structures or other projections are present, a foil, such as a tarpaulin foil, can be used comprising at least one row of magnets.

In case the gap with the bulkhead includes staggered sections, such as with wing tanks, the seals terminal end can be provided with a piece of foil under right angles with both webs.

To cover for example a hingebox of a door, e.g., of an elevator, a seal can be used made of a longitudinal flexible foil material, such as a tarp, comprising a row of magnets along the longitudinal sides and optionally also along the shorter sides. Such doors typically show a horizontal gap, the hingebox opening, between their top end and the ship wall, which also needs to be sealed to prevent leakage. This gap can first be filled with a piece of wood, such as plywood. Then a further piece of wood, such as plywood can be nailed onto the first piece of wood, overlapping the hingebox opening. Finally the seal can be placed over the plywood. The seal can for example comprise one, two or more strips or belts extending in the longitudinal direction of the seal. The strips can for example be stitched or adhered onto the seals. These strips can be stapled to the plywood. The magnets can then attach the seal to the ship wall and bulkhead door respectively.

To be able to cover all gaps between the bulkheads and the cargo hold wall, a set of seals can be used comprising one or more of the types of seals described above. The set can also comprise the fastening means as described above and/or plugs for filling openings to be covered by the seals. The plugs can for example be plywood or plastic plugs.

BRIEF DESCRIPTION OF THE DRAWINGS

Aspects of the present invention will be elucidated with reference to the figures wherein.

DETAILED DESCRIPTION

Figure 1:
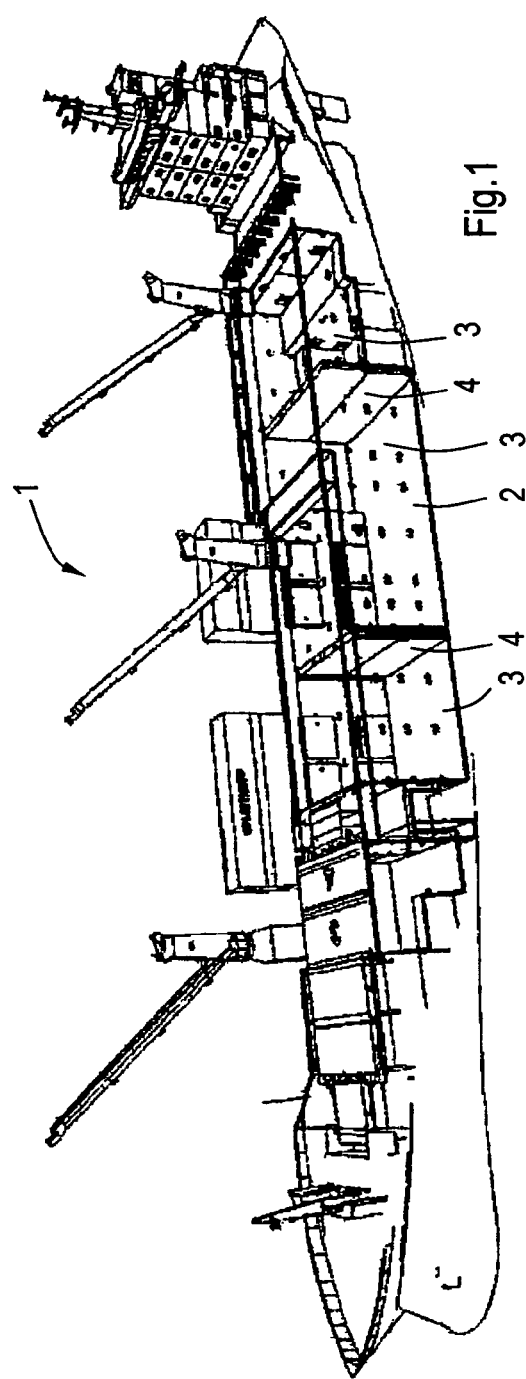
FIG. 1: shows a ship with the side wall partly broken away having a cargo load compartmented by bulkheads.

FIG. 1 shows a cargo ship 1 for bulk cargo. In the drawing, the side wall is partly broken away to show a cargo hold 2 which is divided into a number of compartments 3 by a number of removable bulkheads 4. The compartments 3 can be used for different types of bulk cargo, for instance grain, ore, concentrates or a combination of bulk cargo and other types of cargo.

Figure 2:
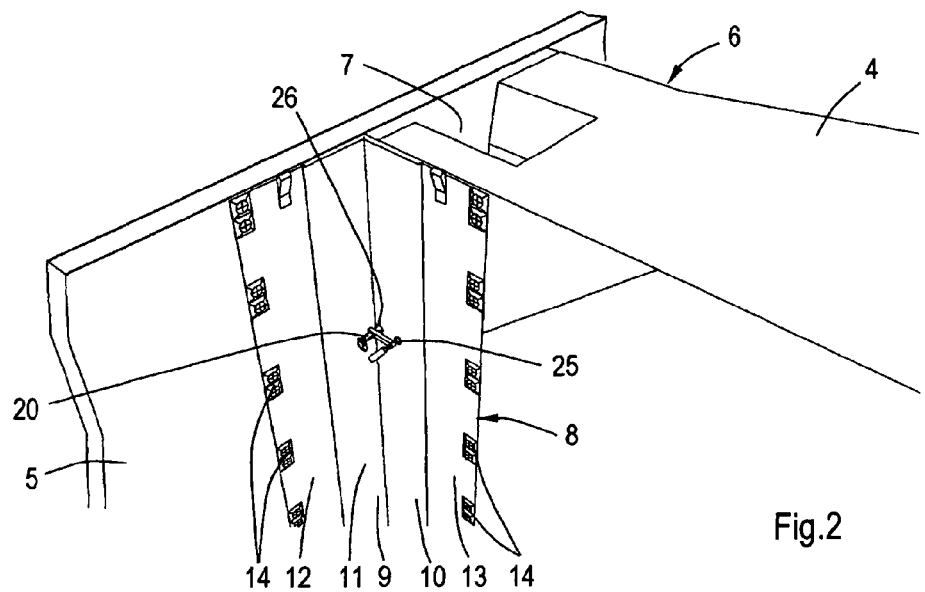
FIG. 2: shows in detail a seal attached to a bulkhead and a ship side wall.

FIG. 2 shows in detail the position where the bulkhead 4 meets the inner wall 5 of the cargo hold 2. Between the wall 5 and the bulkhead 4 is a gap 6, which needs to be sealed at least at one side to prevent leakage of bulk cargo. On its side facing the inner wall 5, the bulkhead 4 is provided with a channel 7, which can be slid over support brackets or pontoon supports projecting from the inner wall 5 (not shown).

The gap 6 is sealed with a seal 8, comprising a spine 9, formed as an angled profile having two legs 10, 11 under right angles. The seal 8 further comprises two lateral webs 12, 13 of a tarpaulin material. The webs 12, 13 are both bordered by a row of magnets 14, which are attached to the webs 12, 13 or which are for example contained in pockets or the like within the webs 12, 13.

Figure 3:
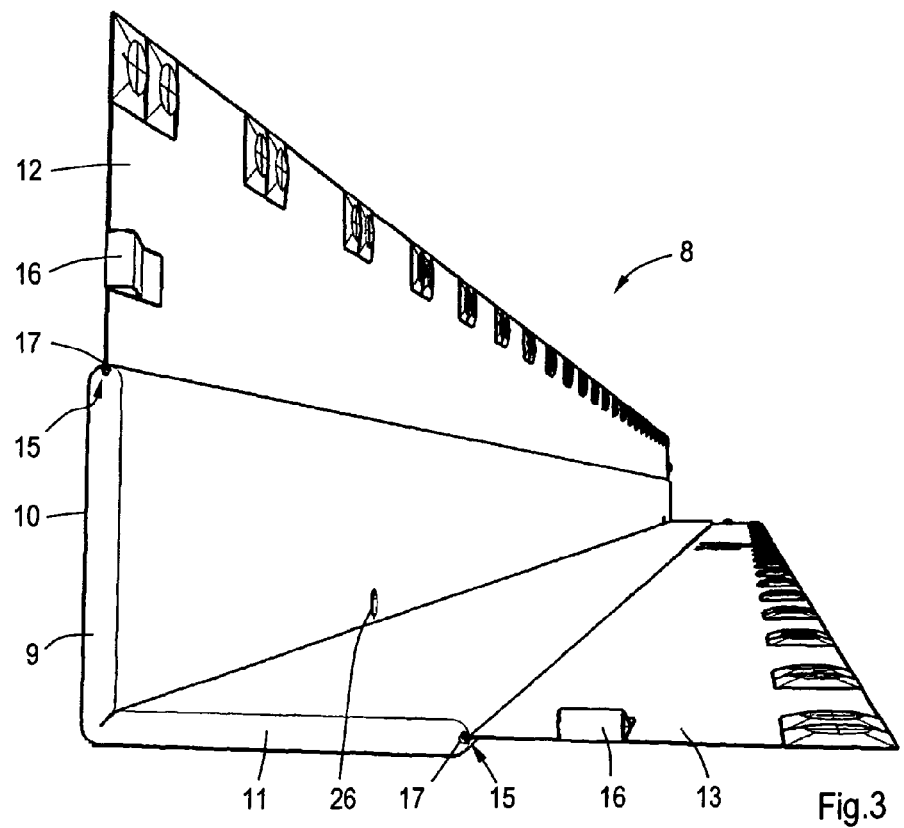
FIG. 3: shows the seal of FIG. 2 in more detail.

FIG. 3 shows the top side of the seal 8. Both legs 10, 11 of the angled profile spine 9 are provided at their outer ends with slits 15 extending over the full length of the spine 9. Each slit 15 firmly clamps one of the longitudinal edges of the corresponding web 12, 13. To provide a firm grip of slit 15, the edge of the web 12, 13 is provided with an embedded chord 17, which can for example be stitched within the web edge. At their outer ends, the webs 12, 13 are provided with a sling 16, which is used for pulling the webs 12, 13 through the slits 15 during assembling of the seal 8.

Figure 4:
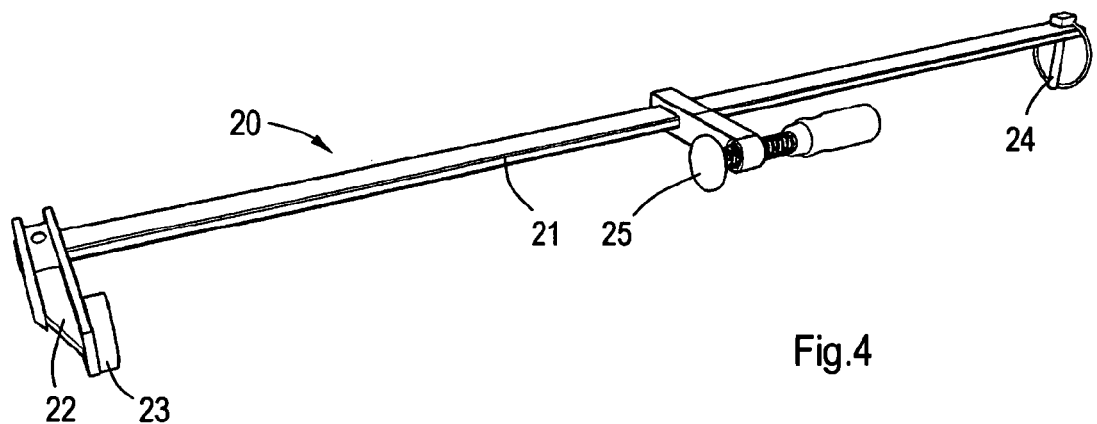
FIG. 4: shows an F-bar for use with the seal of FIG. 2.

The seal 8 can for example be installed by using an F-bar clamp 20 as shown in more detail in FIG. 4, comprising a bar 21 having a fixed clamp head 22 provided with a magnet 23 at one end and a removable securing pin 24 at the other outer end. A movable clamp head 25, facing the magnet 23, can be moved between the securing pin 24 and the fixed clamp head 22. To install a seal 8, the F-bar tool 20 without its moveable clamp head 25 is positioned with the fixed clamp head 22 in the channel 7 in the bulkhead 4, and with the bar 21 extending through the gap 6. Due to the magnet 23, the F-bar tool 20 will maintain its position. The angled profile 9 of the seal 8 is provided with an opening 26 (see FIGS. 2 and 3). The profile 9 can be slid over the projecting bar 21 of the F-bar tool 20 to its final vertical position. Then, the movable clamp head 25 can be slid over the bar 21 and arranged to clamp the profile leg 10 of seal 8 onto the bulkhead 4, as is shown in FIG. 2. The same can be done at the lower end of the seal 8. The magnets 14 of the webs 12, 13 adhere to the bulkhead 4 and to the inner wall 5, respectively.

Figure 5A:
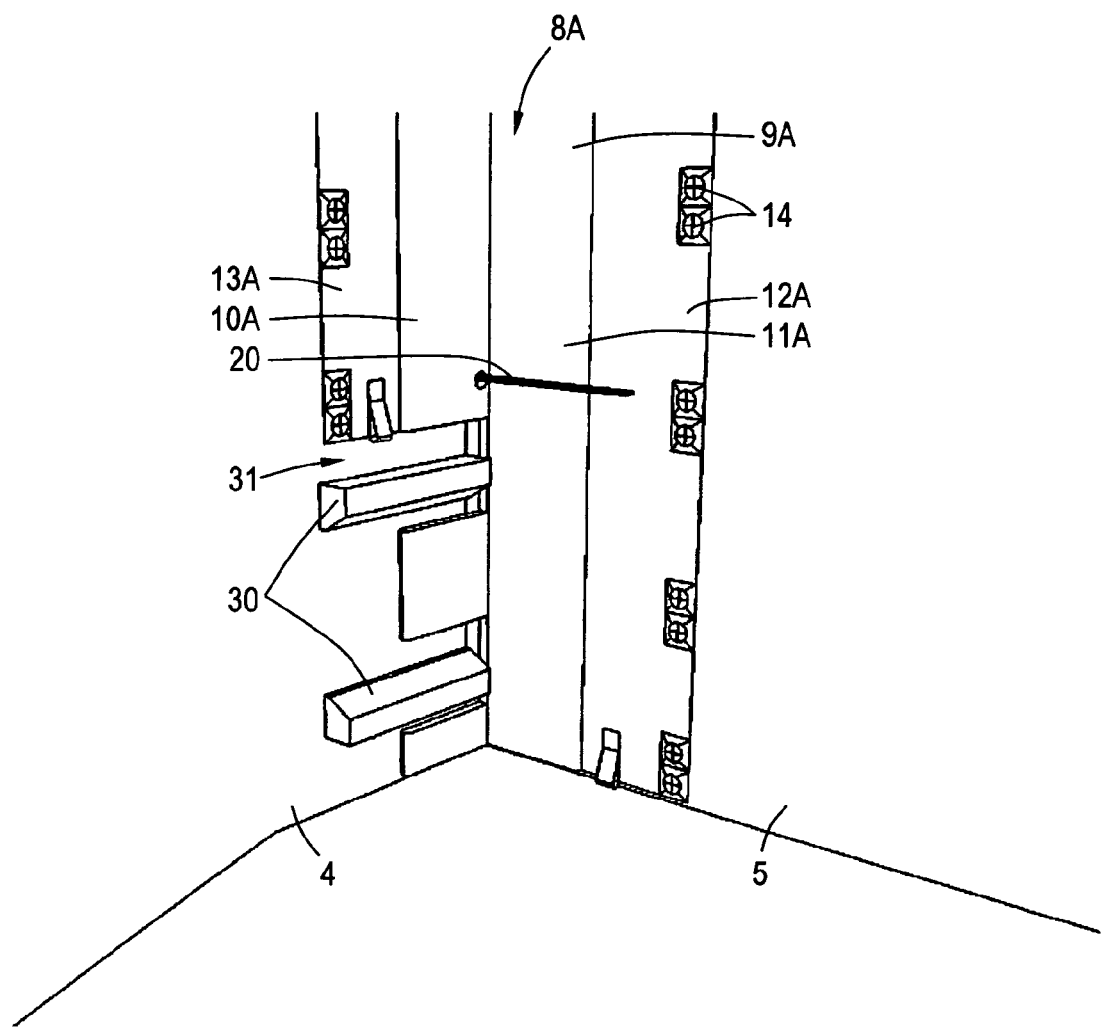
FIG. 5A: shows a second embodiment of a seal.
Figure 5B:
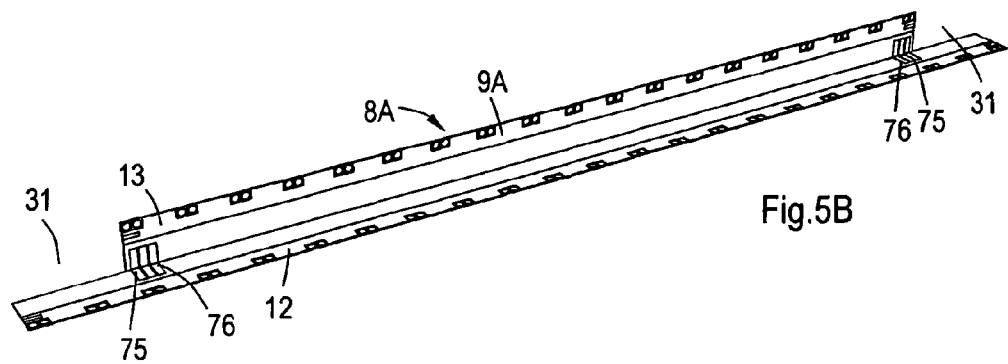
FIG. 5B: shows the seal of FIG. 5A in its entirety.
Figure 6:
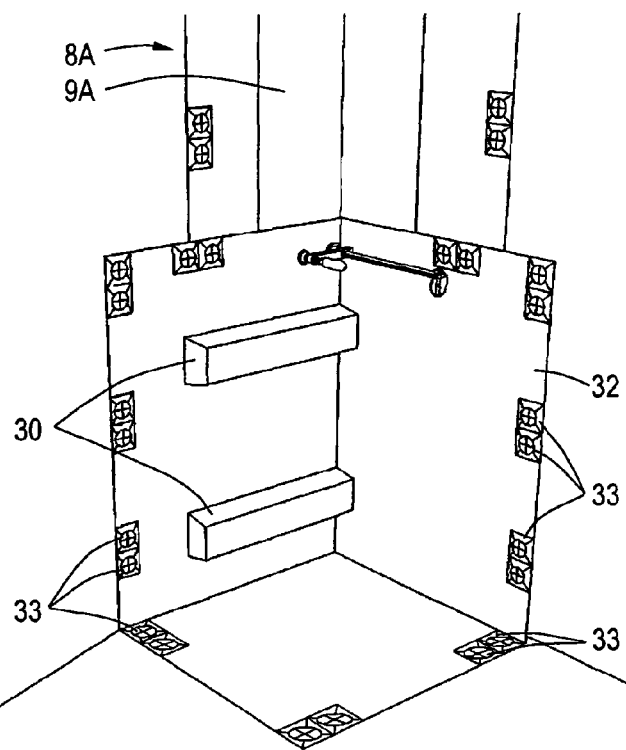
FIG. 6: shows the section of FIGS. 5A and 5B after sealing with a sealing foil.

At its backside, the bulkhead 4 is provided with tween deck positioners 30 close to the inner wall 5, as shown in FIG. 5A. Here, a seal 8A is used with an angle profiled spine 9A provided with a cutout 31 making one leg 10A of the profile with the corresponding web 13A shorter than the other leg 11A with the web 12A to leave the tween deck positioners 30 free. To prevent leakages of bulk cargo at these locations, the cutout 31 and the tween deck positioners 30 are covered with a separate tarpaulin 32 (see FIG. 6) provided with magnets 33. At its other end, the seal 8A can also be provided with a similar cutout, as is shown in FIG. 5B showing the seal 8A in its entirety. As shown in FIG. 5B, the seal 8A comprises a flap 75 at short distance from the cutout 31. The side of the flap 75 which is furthest away from the cutout 31 is provided with a strip 76 which is attached to the spine 9A. The free end of the flap 75 can be positioned over the upper edge of the tarpaulin 32 covering the positioners 30.

Figure 7:
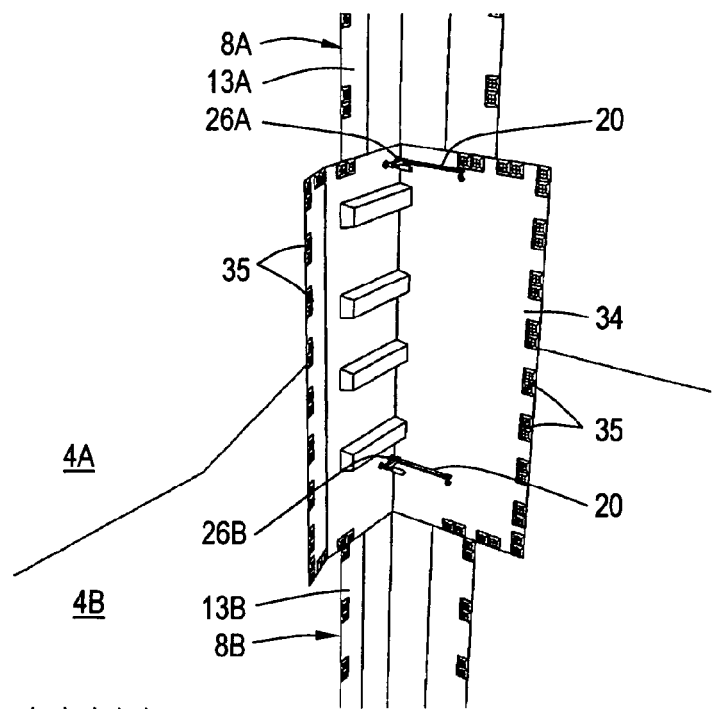
FIG. 7: shows an intersectional seal for sealing two stacked bulkheads.

A similar overlapping tarpaulin 34 with magnets 35 can be used if a partition of the cargo hold is formed by two stacked bulkheads 4a, 4b as shown in FIG. 7. Two seals 8a, 8b are installed in line with each other. The tarpaulin webs 13a, 13b attached to the bulkheads 4a, 4b are interrupted where the bulkheads 4a, 4b are provided with tween deck positioners. The tarpaulin 34 covers these interruptions. The tarpaulin 34 is provided with openings 26a, 26b for passage of an F-bar tool clamping the seals 8a, 8b.

Figure 8:
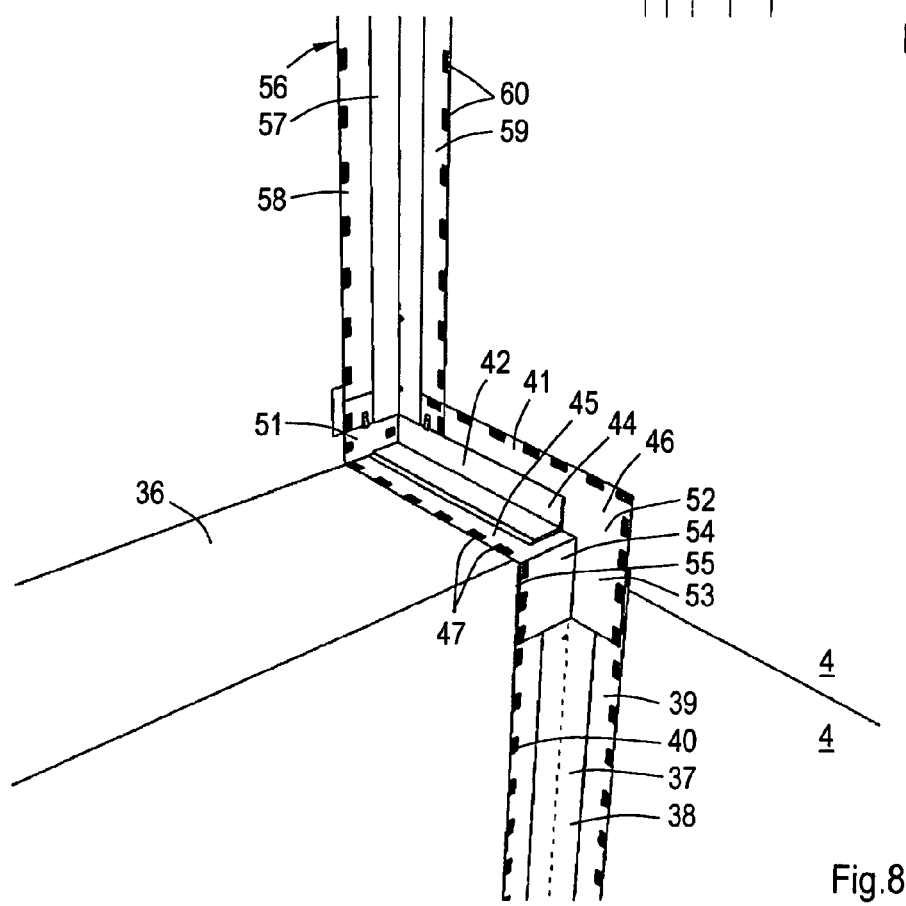
FIG. 8: shows a seal for a staggered section.

FIG. 8 shows how the gaps can be sealed where the surface of the internal cargo hold wall is staggered, e.g., at the location of a wing tank 36 or the like. First a seal 37 is applied over the vertical gap between the bulkhead 4 and the wing tank 36 in a similar way as described with FIG. 2. This seal 37 has an angle profiled spine 38, with two lateral tarpaulin webs 39 provided with magnets 40. Then a specially formed sealing piece 41 is used to seal the gap between the bulkhead 4 and the horizontal section of the wing tank 36. Sealing piece 41 comprises a middle section 42 with a built-up similar to the seal of FIG. 2. The section 42 comprises an angle profiled spine 44 with two lateral tarpaulin webs 45, 46 provided with magnets 47. One of the tarpaulin webs 45 extends in the horizontal plane while the other tarpaulin web 46 is oriented vertically. At one end of this middle section 42, the sealing piece 41 comprises a tarpaulin end section 51 under right angles with both tarpaulin webs 45, 46 of the middle section 42. At the other end of the middle section 42, the sealing piece 41 comprises a transitional end section 52 in line with the first seal 37. This transitional section 52 comprises two tarpaulin webs 53, 54 under right angles with each other, the first web 53 being in the same plane as the vertical web 46 of the middle section 41, and the second web 54 being under right angles with the horizontal web 45 of the middle section 42. Also the tarpaulin webs 53, 54 of the transitional section 52 are provided with magnets 55. Then a further seal 56 is used, similar to the seal described for FIG. 2, having an angle profiled spine 57 and two lateral tarpaulin webs 58, 59. The first tarpaulin web 58 overlaps the tarpaulin end section 51 of sealing piece 41. The second tarpaulin web 59 overlaps vertical web 46 of sealing piece 41. Also these tarpaulin webs 58, 59 are provided with magnets 60.

Figure 9:
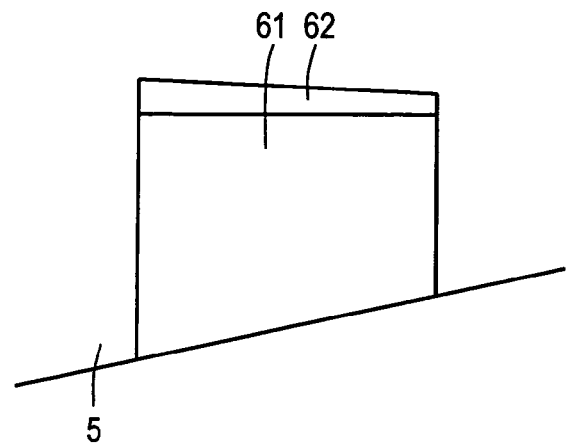
FIG. 9: shows a bulkhead door.
Figure 10:
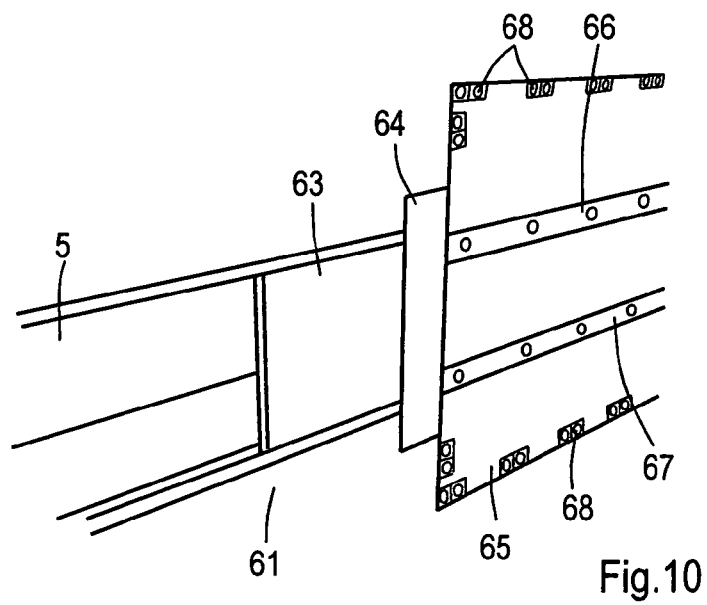
FIG. 10: shows a seal for sealing a bulkhead door.

The internal wall 5 in the cargo hold is generally provided with one or more doors 61, such as is shown in FIG. 9. These doors 61 can for example be elevator doors, or ventilation doors or the like and typically show a horizontal gap 62 between their top end and the ship wall, which also needs to be sealed to prevent leakage. As shown in FIG. 10, first a piece of timber 63 is placed within the gap 62. Then a piece of wood, e.g., plywood 64 is nailed on the piece of timber 63. Finally a tarpaulin seal 65 is placed over the plywood 64. The tarpaulin seal 65 comprises two securing strips 66, 67 extending in the longitudinal direction of the tarpaulin seal 65. The tarpaulin seal 65 comprises magnets 68 evenly distributed along its edges. The securing strips 66, 67 of the tarpaulin seal 65 are made of woven slings and are stapled to the plywood 63. The magnets 68 attach the tarpaulin 65 to the ship wall 5 and bulkhead door 61 respectively.

Figure 11:
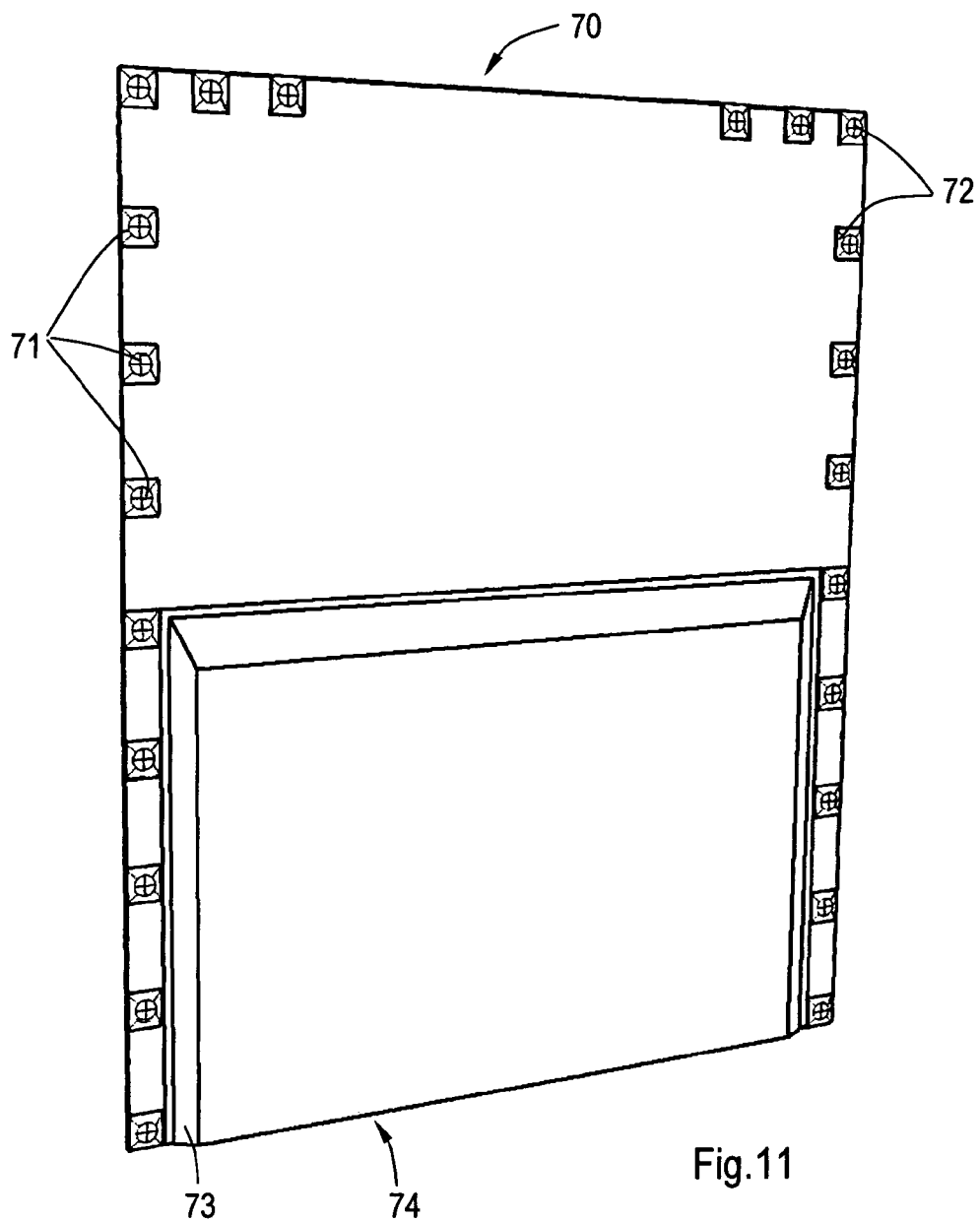
FIG. 11: shows an intersection seal of a set of seals.

FIG. 11 shows an intersection seal 70 that can be used to prevent gaps between the abutting ends of two seals 8 placed in line with each other. The intersection seal 70 is made of a flexible material, such as a tarp, without a spine element. The intersection seal 70 has a row of magnets 71, 72 at two opposite sides and a pocket 73 with an open end 74 at its lower side. One of the abutting ends of two spined seals (not shown) can be put in the pocket 73. For instance, the top end of a lower seal 8 can be put into the pocket 73. The abutting lower end of the upper seal 8 can then be applied over the intersection piece 70. This way, no gap is left uncovered between the abutting ends of the two seals in line. of the spine.

The invention claimed is:

1. A releasable seal for sealing a gap between a bulkhead and a wall of a cargo hold, wherein the seal comprises a non-pliant spine extending along a length of the seal and two lateral webs extending in a widthwise direction from opposing sides of the spine, wherein the webs comprise magnetic parts, wherein the spine is an angled profile having two legs under right angles, and wherein the legs are provided with slits along their longitudinal top edges for clamping a longitudinal edge of a lateral web.

2. The seal according to claim 1 wherein a chord is provided along the longitudinal edge of the lateral web and wherein the edge with the chord is held in the slit in the longitudinal top edge of the legs of the spine.

3. A set of bulkhead seals, at least one of the seals sealing a gap between a bulkhead and a wall of a cargo hold, wherein the at least one of the seals comprises a non-pliant spine extending along a length of the at least one of the seals and two lateral webs extending in a widthwise direction from opposing sides of the spine, wherein the webs comprise magnetic parts, and wherein the set comprises a longitudinal foil web with a row of magnets along both longitudinal sides and two strips parallel to the rows of magnets.

4. A seal for sealing a gap between a bulkhead and a wall of a cargo hold, wherein the seal comprises:
a rigid spine extending along a length of the seal, the spine comprising two sections having rigid planar surfaces extending at a fixed angle relative to each other; and
two lateral webs, wherein a lateral web extends in a widthwise direction from opposed edges of each planar section, wherein a lateral web extends along a length of each planar section, each lateral web formed from a material different than and more flexible than a material of the sections.

5. The seal of claim 4, wherein the rigid spine separates the two lateral webs from each other.

6. A releasable seal for sealing a gap between a bulkhead and a wall of a cargo hold, wherein the seal comprises a rigid spine extending along a length of the seal and two lateral webs extending in a widthwise direction from opposing sides of the spine, wherein the webs comprise magnetic parts.

7. The seal according to claim 6 wherein the spine is an angled profile having two legs under right angles.

8. The seal according to claim 6 wherein the lateral webs are of a tarpaulin material.

9. The seal according to claim 6 wherein the spine is provided with an opening near one or both of its outer ends for passage of a fastener.

10. The releasable seal of claim 6, wherein the two lateral webs are separated by the spine.

11. A set of bulkhead seals, at least one of the seals being according to claim 6.

12. The set according to claim 11 wherein the set further comprises one or more seals without a spine, which seals are made of a flexible material with a row of magnets along at least two sides.

13. The set according to claim 12 wherein one of the seals without a spine comprises a pocket for holding an outer end of one of the other seals.

14. The set according to claim 11 wherein the set further comprises a second type of seal comprising a cutout in the spine and/or one of the webs allows passage of support structures or the like on the cargo hold wall and/or on the bulkhead.

15. The set according to claim 11 wherein the set comprises one or more fastening clamps.

16. The set according to claim 15 wherein the fastening clamp is an F-bar comprising a bar having a fixed clamp head at its outer end, and a removable clamp head slideable over the bar, wherein the fixed clamp head is provided with a magnet facing the removable clamp head.

17. The set according to claim 11 wherein the set further comprises plugs for filling openings near the gap to be sealed.

* * * * *